Nov. 29, 1949     G. B. COLBY     2,489,482
SPRING HOLDER FOR COFFEE FILTERS
Filed Sept. 25, 1946
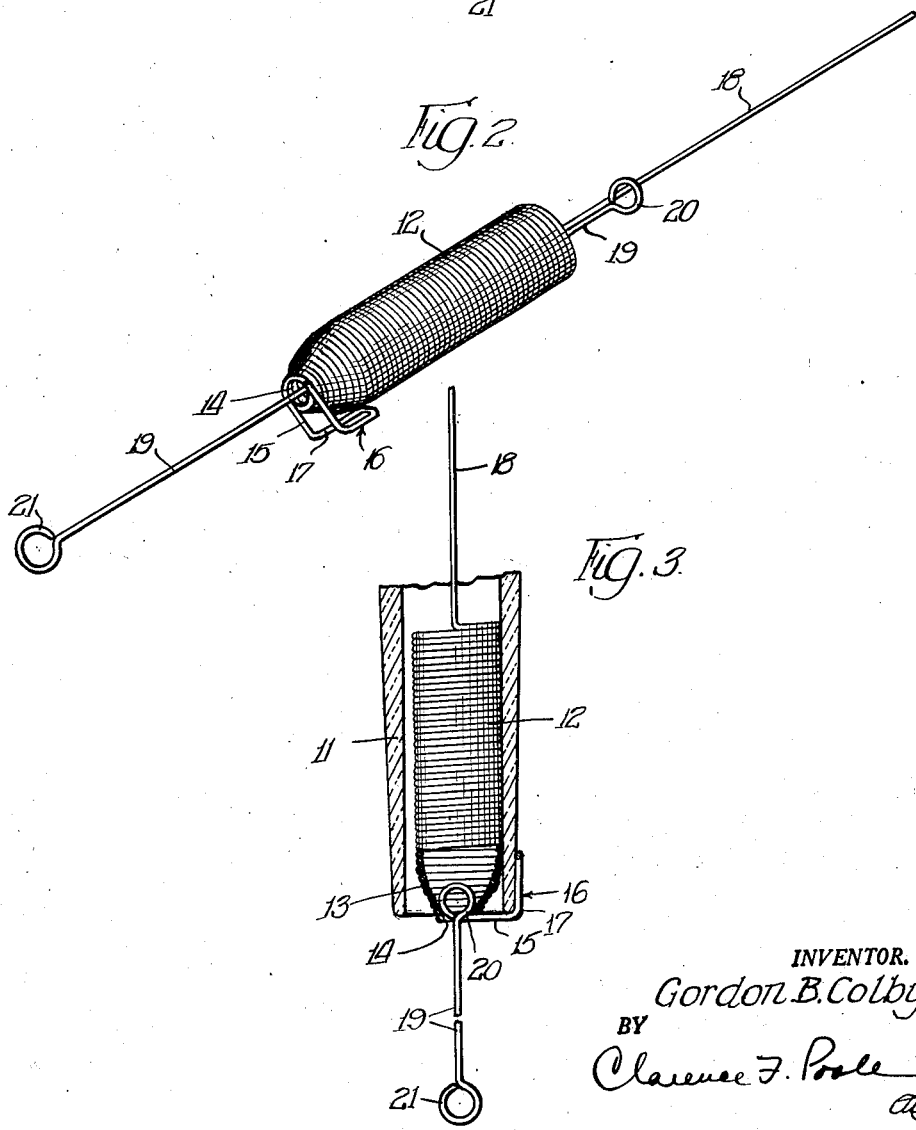
INVENTOR.
Gordon B. Colby,
BY Clarence F. Poole Patented Nov. 29, 1949

2,489,482

UNITED STATES PATENT OFFICE 2,489,482

SPRING HOLDER FOR COFFEE FILTERS

Gordon B. Colby, Chicago, Ill., assignor to Central Can Company, Chicago, Ill., a corporation of Illinois Application September 25, 1946, Serial No. 699,218

5 Claims. (Cl. 267—74)

This invention relates to improvements in spring holders especially adapted for coffee brewing filters, but not necessarily limited to such use, and has for its principal object to provide a simple, economical, sanitary device of the character described.

It is common practice to provide a coil spring device attached to the filter element of a coffeemaker, having an extended hook for engaging the bottom end of the depending tube leading to the bottom chamber of the coffeemaker. Such devices are also provided with a flexible chain connected to the hook for pulling the hook into engaged position.

In carrying out my present invention, I provide an improved form of spring holder and pull member, the advantages of which will more particularly appear from the following description of the accompanying drawing in which:

Figure 1 is a side view of a coffee brewer of a conventional type to which my invention has been applied;

Figure 2 is an enlarged perspective detailed view of the spring holder and pull member constructed in accordance with my invention; and Figure 3 is a fragmentary detailed section showing the glass tube depending from the upper container of the coffee brewer, and showing my improved spring holder attached therein.

Referring now to details of the embodiment of my invention shown in the drawings, the coffeemaker to which it is applied, consists of an upper container A, usually of glass, having a depending tube 11 adapted for insertion in a lower container B in the customary manner. A filter element 10 of any suitable form is provided for detachable mounting as usual at the upper end of the glass tube 11.

My improved spring holder for the filter element 10 consists of a length of coiled spring 12 having its upper end suitably connected to the bottom of the filter by a centered length of wire 18 forming a continuation of the upper end of said spring.

One or more of the lowermost coils of the spring 12 are formed of gradually decreasing helices, as indicated at 13 so as to form a tapered lower end with a relatively restricted central opening 14 at the bottom end of the coil, having a diameter substantially smaller than that of the main body of said coil.

The end of the lowermost coil has an extended portion 15 laterally disposed and bent upwardly to form a hook indicated generally at 16 disposed along and adjacent the outer side of the main body of the coil 12. In the form shown, said hook consists of an upright portion 17 generally of inverted U-shape in side elevation, spaced from the adjacent side wall of the coil spring 12 a distance sufficient to yieldably engage the bottom edge of the upright glass tube 11 therebetween when the filter device is secured in place. As will be seen in Figure 3, the free or terminal end of the hook 16 terminates on the side of the restricted bottom opening 14 of the coil spring opposite the laterally projecting portion 15 of the hook.

In connection with the spring member and its hook, I provide a pull member for extending the spring when the hook is to be engaged on the bottom edge of the glass tube 11. This pull member consists of a single length of wire 19 which is slidably mounted in the restricted opening 14 at the bottom of the coil and has enlarged eyes 20 and 21 formed at its upper and lower ends, respectively, so as to limit the endwise movement of the pull member relative to the coil. The arrangement is such that the pull member 19 will normally be extended by gravity to its lowermost position with the upper eye 20 seated in the tapered lower end 13 of the coil 12, when the filter with its depending spring holder is inserted in the upper end of the glass tube 11, and in this position, the lower eye 21 of the pull member will project below the end of the glass tube in position to be readily grasped for extending the spring until the hook 16 is engaged with the bottom edge of the glass rod, as shown in Figure 3. It will be noted that the hook 16 tends to hold the lower end of the coil spring in an upright position against the side of the glass tube when the hook is yieldably clamped over the lower edge of the glass tube, as above described.

When the upper container A is thereafter inserted in the lower container B in the usual manner, it will be understood that the pull member 19 will be automatically telescoped upwardly into the coil spring 12 by engagement with the bottom wall of the lower container, as shown in Figure 1.

The tapered portion 13 at the lower end of the coil spring aids in inserting said spring in the upper end of the glass tube 11, and also forms a socket for the terminal eye 20 of the pull rod.

The provision of the pull member 19 consisting of a single length of wire with enlarged eyes at opposite ends as described, is especially simple and economical in construction, and is more sanitary than the flexible chains heretofore commonly used for pull members, which tend to accumulate sludge and are very difficult to keep clean.

Although I have shown and described a certain embodiment of my invention, it will be understood that I do not wish to be limited to the exact construction shown and described, but that various changes and modifications may be made without departing from the spirit and scope of the invention as defined in the appended claims.

I claim:

1. A spring holder for coffee brewer filters, and the like, comprising a coil spring with its end coil of reduced diameter forming a restricted opening at the bottom of the coil, and having a terminal portion bent laterally and thence upwardly along the outer side of the said coil in upwardly opening yieldable clamping relation to the latter and a pull member slidably mounted in said restricted opening for limited telescopic movement relative to said coil.

2. A spring holder for coffee brewer filters, and the like, comprising a coil spring with its end coil of reduced diameter forming a restricted opening at the bottom of the coil, and having a terminal portion bent laterally and thence upwardly along the outer side of the said coil in upwardly opening yieldable clamping relation to the latter, and a pull member consisting of a rod having enlargements at opposite ends slidably mounted in said restricted opening for limited telescopic movement relative to said coil.

3. A spring holder for coffee brewer filters, and the like, comprising a coil spring with its end coil of reduced diameter forming a restricted opening at the bottom of the coil, and having a terminal portion bent laterally and thence upwardly along the outer side of the said coil in upwardly opening yieldable clamping relation to the latter and a pull member consisting of a single length of wire rod with enlarged eyes at opposite ends slidably mounted in said restricted opening for limited telescopic movement relative to said coil.

4. A spring holder for coffee brewer filters, and the like, comprising a coil spring with its lowermost coils forming an inwardly tapered portion with a restricted opening at the bottom of the coil, and having a terminal portion bent laterally and thence upwardly along the outer side of the said coil in upwardly opening yieldable clamping relation to the latter and a pull member slidably mounted in said restricted opening for limited telescopic movement relative to said coil.

5. A spring holder for coffee brewer filters, and the like, comprising a coil spring with its end coil of reduced diameter forming a restricted opening at the bottom of the coil, and having a terminal portion bent laterally and thence upwardly along the outer side of the said coil in upwardly opening yieldable clamping relation to the latter and a pull member consisting of a single length of wire rod with enlarged eyes at opposite ends slidably mounted in said restricted opening for limited telescopic movement relative to said coil, so that the enlarged eye at the upper end of said rod will seat in the tapered portion of said coil when rod is in fully extended position.

GORDON B. COLBY.

REFERENCES CITED

The following references are of record in the file of this patent:

UNITED STATES PATENTS

| Number | Name | Date |
|---|---|---|
| 128,145 | Hill | June 18, 1872 |
| 478,712 | Pew | July 12, 1892 |
| 1,179,590 | Whitcomb | Apr. 18, 1916 |
| 1,794,911 | Livermore | Mar. 3, 1931 |
| 2,286,254 | Brault | June 16, 1942 |